US012609560B2

(12) United States Patent
Wu

(10) Patent No.: US 12,609,560 B2
(45) Date of Patent: Apr. 21, 2026

(54) WIRELESS CHARGING METHOD AND APPARATUS, ELECTRONIC DEVICE AND STORAGE MEDIUM

(71) Applicant: Beijing Xiaomi Mobile Software Co., Ltd., Beijing (CN)

(72) Inventor: Pengfei Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 1043 days.

(21) Appl. No.: 17/680,688

(22) Filed: Feb. 25, 2022

(65) Prior Publication Data

US 2023/0081239 A1 Mar. 16, 2023

(30) Foreign Application Priority Data

Sep. 10, 2021 (CN) .......................... 202111062352.6

(51) Int. Cl.
| | |
|---|---|
| *H02J 50/80* | (2016.01) |
| *H02J 7/00* | (2006.01) |
| *H02J 50/12* | (2016.01) |
| *H02J 50/40* | (2016.01) |

(52) U.S. Cl.
CPC ............ *H02J 50/80* (2016.02); *H02J 7/0048* (2020.01); *H02J 50/12* (2016.02); *H02J 50/40* (2016.02)

(58) Field of Classification Search
CPC .......... H02J 50/80; H02J 7/0048; H02J 50/12; H02J 50/40; H02J 7/00034
See application file for complete search history.

(56) References Cited

U.S. PATENT DOCUMENTS

| | | | | |
|---|---|---|---|---|
| 9,252,844 | B2 * | 2/2016 | Kim ........................ | H02J 50/12 |
| 10,193,397 | B2 * | 1/2019 | Zeine ...................... | H02J 50/80 |
| 11,641,134 | B2 * | 5/2023 | Mohan .................... | H02J 50/90 |
| | | | | 320/108 |
| 11,855,477 | B2 * | 12/2023 | Wan .................... | H02J 7/00045 |
| 2012/0025631 | A1 * | 2/2012 | Shionoiri ................ | H02J 50/80 |
| | | | | 307/149 |
| 2016/0380487 | A1 * | 12/2016 | Widmer .................. | B60L 53/39 |
| | | | | 324/654 |

(Continued)

FOREIGN PATENT DOCUMENTS

| | | | | | |
|---|---|---|---|---|---|
| CN | 112928786 A | * | 6/2021 | ............. | H02J 50/10 |
| WO | 2014/171773 A1 | | 10/2014 | | |
| WO | WO-2020124563 A1 | * | 6/2020 | ............. | H02J 50/12 |

OTHER PUBLICATIONS

Xiong et al., "TDMA in Adaptive Resonant Beam Charging for IoT Devices," in IEEE Internet of Things Journal, vol. 6, No. 1, pp. 867-877, Feb. 2019.

(Continued)

*Primary Examiner* — Drew A Dunn
(74) *Attorney, Agent, or Firm* — Volpe Koenig

(57) ABSTRACT
A wireless charging method applied to a power supply device, the method includes: negotiating charging parameters with a plurality of target power receiving devices, the target power receiving devices being: devices determined to receive wireless charging from the power supply device; selecting charging parameters supported by both the plurality of target power receiving devices and the power supply device as target parameters; and utilizing a first coil to wirelessly charge the plurality of target power receiving devices according to the target parameters.

18 Claims, 5 Drawing Sheets

S110: Negotiate charging parameters with a plurality of target power receiving devices, the target power receiving devices being: devices determined to receive wireless charging from a power supply device S121: After sensing any one device to receive power, negotiate a charging protocol with the device to receive power, the device to receive power being: a device preparing to receive wireless charging from the power supply device S122: In response to determining that the device to receive power supports a target protocol selected by the power supply device through negotiation, determine the device to receive power as the target power receiving device S123: Determine the target parameters according to the target protocol S130: Utilize a first coil to wirelessly charge the plurality of target power receiving devices according to the target parameters

(56)     References Cited

U.S. PATENT DOCUMENTS

| | | | | |
|---|---|---|---|---|
| 2018/0084406 A1* | 3/2018 | Tandai | .................... | H04W 8/24 |
| 2018/0295557 A1* | 10/2018 | Zeine | ...................... | H04B 7/04 |
| 2019/0058360 A1* | 2/2019 | Garbus | .................. | H02J 50/10 |
| 2020/0021138 A1 | 1/2020 | Yeo et al. | | |
| 2020/0136438 A1* | 4/2020 | Seong | ................... | G05D 1/028 |
| 2025/0004603 A1* | 1/2025 | Kobori | ................... | G06F 3/046 |

OTHER PUBLICATIONS

Extended European Search Report dated Aug. 3, 2022 for European Patent Application No. 22158748.8.

\* cited by examiner

S110: Negotiate charging parameters with a plurality of target power receiving devices, the target power receiving devices being: devices determined to receive wireless charging from a power supply device

↓

S120: Select charging parameters supported by both the plurality of target power receiving devices and the power supply device as target parameters

↓

S130: Utilize a first coil to wirelessly charge the plurality of target power receiving devices according to the target parameters

Fig. 1

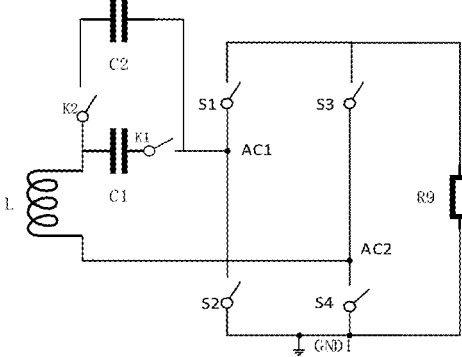

Fig. 2A

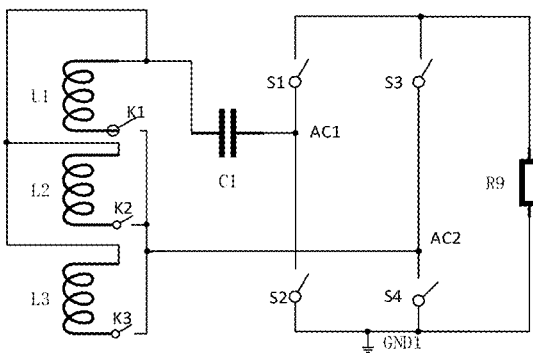

Fig. 2B

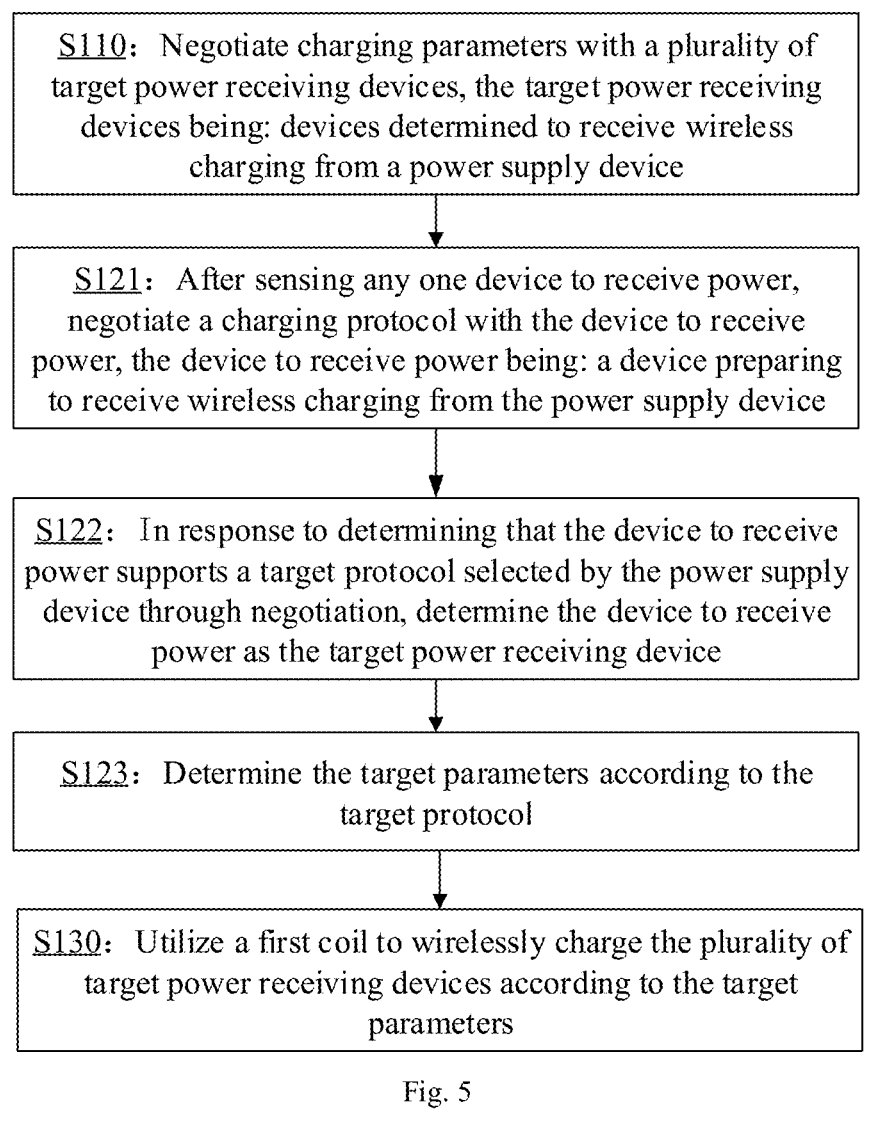

S110: Negotiate charging parameters with a plurality of target power receiving devices, the target power receiving devices being: devices determined to receive wireless charging from a power supply device S121: After sensing any one device to receive power, negotiate a charging protocol with the device to receive power, the device to receive power being: a device preparing to receive wireless charging from the power supply device S122: In response to determining that the device to receive power supports a target protocol selected by the power supply device through negotiation, determine the device to receive power as the target power receiving device S123: Determine the target parameters according to the target protocol S130: Utilize a first coil to wirelessly charge the plurality of target power receiving devices according to the target parameters

Fig. 5

WIRELESS CHARGING METHOD AND APPARATUS, ELECTRONIC DEVICE AND STORAGE MEDIUM

CROSS REFERENCE TO RELATED APPLICATIONS

The present application claims the benefit of priority to Chinese Application No. 2021110623526, filed on Sep. 10, 2021, the contents of which are incorporated herein by reference in their entireties for all purposes.

BACKGROUND

Wireless charging is a charging technology for charging based on wireless carriers without establishing wired connection between a power supply device and a power receiving device. According to charging power, the wireless charging technology can be divided into low-power wireless charging and high-power wireless charging. Generally, low-power wireless charging adopts an electromagnetic induction manner, while high-power wireless charging can adopt resonant charging. In the process of wireless charging, energy is transmitted by a magnetic field between the power supply device and the power receiving device.

However, no matter which wireless charging manner is adopted, the charging efficiency and/or charging rate of wireless charging need/needs to be further improved.

SUMMARY

The disclosure provides a wireless charging method and apparatus, an electronic device, and a storage medium.

A first aspect of examples of the disclosure provides a wireless charging method, applied to a power supply device, the power supply device including: a first coil radiating wireless charging signals to a plurality of directions at the same time. The method includes negotiating charging parameters with a plurality of target power receiving devices, the target power receiving devices being: devices determined to receive wireless charging from the power supply device; selecting charging parameters supported by both the plurality of target power receiving devices and the power supply device as target parameters; and utilizing the first coil to wirelessly charge the plurality of target power receiving devices according to the target parameters.

A second aspect of the examples of the disclosure provides an electronic device, the electronic device including: a first coil radiating wireless charging signals to a plurality of directions at the same time. The electronic device including a memory, configured to store processor-executable instructions, and a processor, connected with the memory.

The processor is configured to execute the computer program in the memory so as to realize negotiating charging parameters with a plurality of target power receiving devices, the target power receiving devices being: devices determined to receive wireless charging from the electronic device;

selecting charging parameters supported by both the plurality of target power receiving devices and the electronic device as target parameters; and utilizing the first coil to wirelessly charge the plurality of target power receiving devices according to the target parameters.

A third aspect of the examples of the disclosure provides a non-transitory computer-readable storage medium. Instructions in the storage medium, when executed by a processor of a computer, cause the computer to execute negotiating charging parameters with a plurality of target power receiving devices, the target power receiving devices being: devices determined to receive wireless charging from a power supply device; selecting charging parameters supported by both the plurality of target power receiving devices and the power supply device as target parameters; and utilizing the first coil to wirelessly charge the plurality of target power receiving devices according to the target parameters.

BRIEF DESCRIPTION OF THE DRAWINGS

The accompanying drawings herein are incorporated into the specification and constitute a part of the specification, show examples consistent with the disclosure, and together with the specification are used to explain the principle of the disclosure.

FIG. 1 is a schematic flow diagram of a wireless charging method illustrated according to an example.

FIG. 2A is a schematic diagram of a circuit structure that a power supply device contains one first coil illustrated according to an example.

FIG. 2B is a schematic diagram of a circuit structure that a power supply device includes a plurality of first coils illustrated according to an example.

FIG. 5 is a schematic flow diagram of a wireless charging method illustrated according to an example.

DETAILED DESCRIPTION

Figure 3:
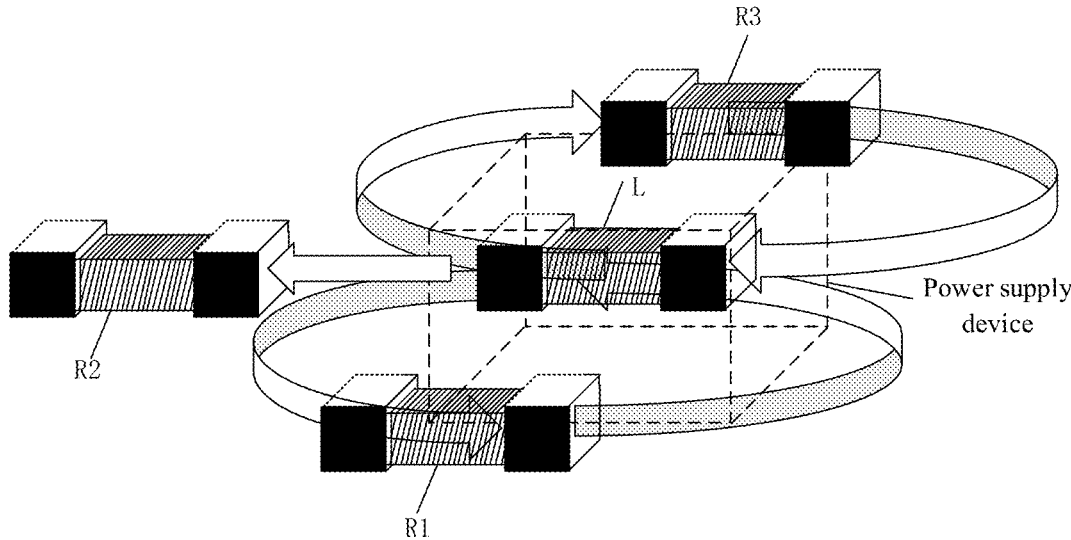
FIG. 3 is a schematic diagram of a flow that one first coil performs wireless charging to a plurality of coils illustrated according to an example.

Examples will be described in detail here, and instances are shown in the accompanying drawings. When the following description refers to the accompanying drawings, unless otherwise indicated, the same numbers in different drawings indicate the same or similar elements. The examples described do not represent all examples consistent with the disclosure. Rather, they are merely instances of apparatuses consistent with some aspects of the disclosure as detailed in the appended claims.

The disclosure relates to the field of electronic techniques, in particular to a wireless charging method and apparatus, an electronic device, and a storage medium.

As shown in FIG. 1, an example of the disclosure provides a wireless charging method, applied to a power supply device, the power supply device including: a first coil. The method includes step S110 charging parameters are negotiated with a plurality of target power receiving devices, the target power receiving devices being: devices determined to receive wireless charging from the power supply device. Then in step S120 charging parameters supported by both the plurality of target power receiving devices and the power supply device are selected as target parameters. Finally, in step S130 the first coil is utilized to wirelessly charge the plurality of target power receiving devices according to the target parameters.

In some examples, the power supply device may be a tablet computer or a notebook computer or a tablet and notebook combined device or the like, and is a device with own large-capacity battery.

In other examples, the power supply device may also be a smart home device with own large-capacity battery or a smart home device connected to the mains supply itself or the like. The smart home device includes, but is not limited to: a smart speaker and/or an electronic photo album.

The target power receiving devices may be devices with small battery capacities, for example, the target power receiving devices may be: a handwriting pen, a wireless keyboard, a wireless mouse, a mobile phone, a smart watch, a smart bracelet and/or a wearable device such as a head-mounted device. The head-mounted device includes, but is not limited to: smart glasses and/or various virtual reality (VR) devices and/or augment reality (AR) devices mounted on the head.

The power supply device may be an electronic device with one first coil and may also be an electronic device with a plurality of first coils. However, considering that the first coil may radiate wireless charging signals to a plurality of directions, compared with that the plurality of first coils are used for radiating the wireless charging signals when there are the plurality of target power receiving devices, the charging efficiency and/or charge rate can be improved.

The first coil may radiate the wireless charging signals to the plurality of directions, so that the target power receiving devices in different directions can all receive the wireless charging signals so as to perform wireless charging.

In step S130 of the example of the disclosure, one first coil may radiate the wireless charging signals in at least two directions respectively, and for example, the first coil may radiate the wireless charging signals to at least two directions that have an angle of 90 degrees.

In another example, the first coil may radiate the wireless charging signals at any point with the first coil as a center, such that the target power receiving devices may receive the wireless charging signals in any direction of the power supply device so as to perform wireless charging. For example, the first coil may uniformly radiate the wireless charging signals in any direction with the first coil as the center.

Since the power supply device may utilize one first coil to radiate the wireless charging signals to the plurality of target power receiving devices at the same time, compared with that one first coil performs wireless charging on one target power receiving device, power consumption caused by that the wireless charging signals are not received by the target power receiving device may be reduced, and the charging efficiency is improved.

The target parameters are charging parameters selected for working of the first coil.

The charging parameters include, but are not limited to, at least one of following a wireless charging technique, including: an electromagnetic induction type wireless charging technique, a magnetic field resonance wireless charging technique and/or a radio wave wireless charging technique. Different wireless charging protocols may adopt different wireless charging techniques. For example, a charging protocol corresponding to a Wi-PO technique adopting the magnetic resonance wireless charging technique, and a charging protocol corresponding to an electric field pulse mode utilizing an invisible power field (iNPOFi); a carrier frequency of a charging carrier; a charging current; a charging voltage; or charging power.

In one example, the target parameters at least include: a carrier frequency of the first coil for radiating the wireless charging signals.

In another example, the target parameters may further include the charging power, the charging voltage or the charging current.

The first coil will radiate the wireless charging signals according to the charging parameters negotiated with the target power receiving devices, and by means of negotiating the charging parameters, safe wireless charging may be achieved, and additionally, wireless charging may be realized as efficiently as possible.

For example, the charging parameters include the carrier frequency, and the first coil radiates the wireless charging signals according to the carrier frequency.

For the carrier frequency of the first coil for radiating the wireless charging signals, if the first coil switches the carrier frequency, it may be realized by switching an inductance value and/or a capacitance value corresponding to the first coil. For example, the first coil may be a variable coil itself, so that when the inductance value of the first coil is switched, it may be realized by switching the quantity of coils contained in the first coil or switching a resistance value of a resistor connected with the first coil. When the capacitance value is switched, it may be realized by switching the quantity of capacitors connected with the first coil and/or switching a capacitance value of a single capacitor. For example, a capacitance value of a variable capacitor is variable.

FIG. 2A may show a working circuit of the first coil, and L in FIG. 2A may indicate the first coil. K1 indicates a switch for whether a capacitor C1 connected with the first coil L is connected, and K2 indicates a switch for controlling whether a capacitor C2 connected with the first coil L is connected. Nodes AC1 and AC2 in FIG. 2A indicate two current input points for providing alternating currents to the first coil L respectively. S1, S2, S3 and S4 each indicate a switch. R9 indicates a resistor.

FIG. 2A is a schematic diagram of a circuit structure that a power supply device contains one first coil L.

In some examples, the power supply device may also contain a plurality of first coils, but only one first coil is in a working state. As shown in FIG. 2B, the power supply device contains three first coils, L1, L2 and L3, respectively. These three first coils L1, L2, and L3 are connected to the same circuit and share the switches S1 to S4 to form a full-bridge inverter circuit, and share the capacitor C1 and the resistor R9. The full-bridge inverter circuit may also be replaced with a half-bridge inverter circuit.

If charging is performed by using the wireless charging method provided by the example of the disclosure, at one moment, the power supply device utilizes one first coil in L1 to L3 to radiate the wireless charging signals so as to perform charging. As such, at one moment, one first coil of the power supply device is in the working state, while the rest of the first coils is in a non-working state. The first coil in the working state radiates the wireless charging signals.

If the power supply device contains the plurality of first coils, the power supply device has at least two working modes, a first mode and a second mode respectively. When the power supply device works in the first mode, one first coil is used to wirelessly charge the plurality of target power receiving devices, specifically as executing steps S110 to S130. When the power supply device works in the second mode, the power supply device may utilize one or more first coils to wirelessly charge the plurality of target power receiving devices at the same time. Referring to the circuit of the first coil shown in FIG. 2A, the carrier frequency at which the first coil L works may be any one of following frequencies:

$$f_1 = \frac{1}{2\pi\sqrt{LC_1}}$$

$$f_2 = \frac{1}{2\pi\sqrt{L(C_1 + C_2)}}$$

$$f_3 = \frac{1}{2\pi\sqrt{LC_2}}$$

where when the carrier frequency is $f_1$, the switch K1 is turned on;

when the carrier frequency is $f_2$, the switches K1 and K2 are turned on;

when the carrier frequency is $f_3$, the switch K2 is turned on; and no matter under which condition the first coil works, S1 to S4 are turned on and turned off alternately and periodically according to full-bridge inverter power. For example, when the switches S1 and S4 are turned off, the switches S2 and S3 are turned on; and when the switches S2 and S3 are turned off, the switches S1 and S4 are turned on. When the switches S2 and S3 are turned on, currents are input to the first coil in the working state from AC1; and when the switches S1 and S4 are turned on, currents are input to the first coil in the working state from AC2.

Referring to the circuit of the first coil shown in FIG. 2B, the carrier frequency at which the first coil L works may be any one of following frequencies:

$$f_1 = \frac{1}{2\pi\sqrt{L_1 C_1}}$$

$$f_2 = \frac{1}{2\pi\sqrt{L_2 C_1}}$$

$$f_3 = \frac{1}{2\pi\sqrt{L_3 C_1}}$$

$$f_4 = \frac{1}{2\pi\sqrt{(L_1 + L_2)C_1}}$$

$$f_5 = \frac{1}{2\pi\sqrt{(L_1 + L_3)C_1}}$$

$$f_6 = \frac{1}{2\pi\sqrt{(L_2 + L_3)C_1}}$$

$$f_7 = \frac{1}{2\pi\sqrt{(L_1 + L_2 + L_3)C_1}}$$

where when the carrier frequency is $f_1$, the switch K1 is turned on;

when the carrier frequency is $f_2$, the switches K1 and K2 are turned on;

when the carrier frequency is $f_3$, the switch K3 is turned on;

when the carrier frequency is $f_4$, the switches K1 and K2 are turned on;

when the carrier frequency is $f_5$, the switches K1 and K3 are turned on; and when the carrier frequency is $f_6$, the switches K1, K2 and K3 are turned on.

No matter under which condition the first coil works, the switches S1 to S4 are turned on and turned off alternately and periodically according to full-bridge inverter power. For example, when the switches S1 and S4 are turned off, the switches S2 and S3 are turned on; and when the switches S2 and S3 are turned off, the switches S1 and S4 are turned on. When the switches S2 and S3 are turned on, currents are input to the first coil in the working state from AC1; and when the switches S1 and S4 are turned on, currents are input to the first coil in the working state from AC2.

If the power supply device works under the first mode, the carrier frequency of the power supply device may be $f_1$ to $f_3$. If the power supply device works under the second mode, the carrier frequency of the power supply device may be $f_1$ to $f_6$.

In some examples, the first coil is a columnar coil formed by winding a plurality of circles of wires, and the columnar coil can radiate the wireless charging signals to the plurality of directions at the same time.

Since the first coil is the columnar coil, the first coil may radiate the wireless charging signals in any direction. The columnar coil may be: a cylindrical coil with a circular cross-sectional shape, or a cuboid coil with a rectangular cross-sectional shape. Such columnar coil may radiate the wireless charging signals to a plurality of directions.

Figure 4:
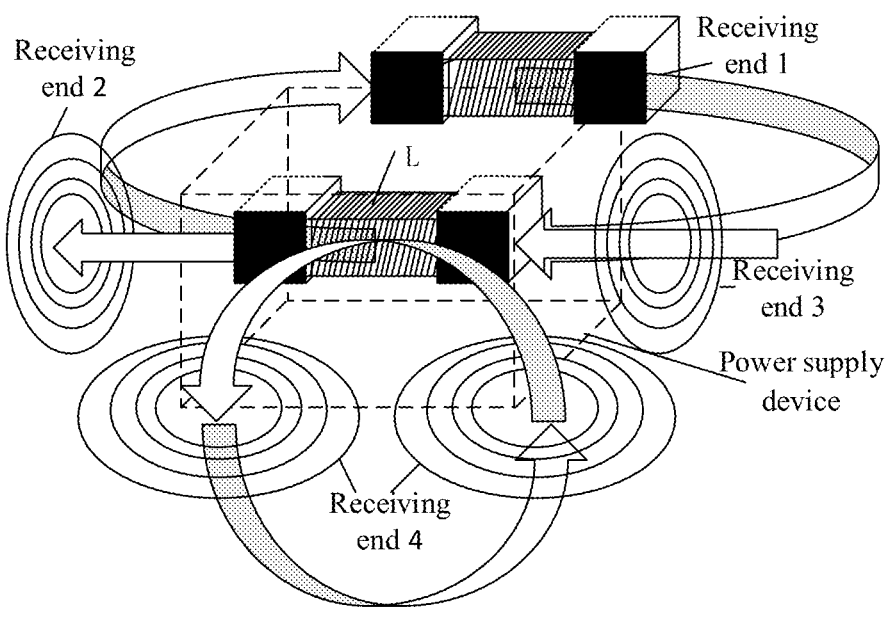
FIG. 4 is a schematic diagram of a flow that one first coil performs wireless charging to a plurality of coils illustrated according to an example.

The coils shown in FIG. 3 and FIG. 4 are both columnar coils, and in FIG. 3, one columnar coil serves as the first coil L to transmit the wireless charging signals to three columnar coils R1, R2, R3. A second coil (R1, R2, or R3) in the target power receiving device receiving charging may be a charging coil in any shape. For example, the second coil may be the columnar coils (stereoscopic coils) shown in FIG. 3 and FIG. 4, and may also be planar coils, as long as it can receive the wireless charging signals radiated by the first coil of the columnar coil type. As shown in FIG. 4, the first coil may perform wireless charging at the same time through a plurality of receiving ends, such as a receiving end 1 to a receiving end 4. Here, one receiving end may correspond to one target power receiving device or the plurality of target power receiving devices. If the target power receiving device contains a plurality of charging coils, the plurality of receiving ends may correspond to one target power receiving device. If one target power receiving device contains one charging coil, one receiving end corresponds to one target power receiving device.

In some examples, as shown in FIG. 5, the method includes step S110, previously described in relation to FIG. 1 and further includes step S121, after sensing any one device to receive power, a charging protocol is negotiated with the device to receive power, the device to receive power being: a device preparing to receive wireless charging from the power supply device. Then in step S122, in response to determining that the device to receive power supports a target protocol selected by the power supply device through negotiation, the device to receive power is determined as the target power receiving device. Next, in step S123, the target parameters are determined according to the target protocol. Finally, the method ends with step S130, as previously described in relation to FIG. 1.

In the example of the disclosure, a hall sensor is disposed in the power supply device. When the target power receiving device is close to the hall sensor in the power supply device, the intensity of an electric field formed by the hall sensor will be affected, so that the hall sensor senses whether a target power receiving device to be charged gets close according to the hall effect.

When the power supply device detects that the device to receive power gets close, the power supply device may broadcast indication information, and since the indication information is broadcast, the device to receive power may receive the information and respond based on the information. As such, the power supply device may know the charging protocol supported by the device to receive power through reception of a response. For example, the response contains protocol information of the charging protocol supported by the device to receive power.

The protocol information includes, but is not limited to: a protocol identification, a protocol version and other information of the charging protocol supported by the device to receive power.

After the power supply device knows the charging protocol supported by the device to receive power, whether the device to receive power supports the target protocol selected by the power supply device may be determined. The target protocol may be a charging protocol determined for wireless charging by the power supply device.

If the device to receive power supports the target protocol, the device to receive power is officially determined as the target power receiving device receiving wireless charging from the power supply device.

After one device to receive power is considered as the target power receiving device, the power supply device will further negotiate the charging parameters with the target power receiving device. For example, the power supply device will send the charging parameters determined according to the target protocol to the target power receiving device, so that the target power receiving device enters into a wireless charging standby state according to the received charging protocol to receive the wireless charging signals radiated by the first coil so as to achieve wireless charging.

If one device to receive power does not support the target protocol selected by the power supply device, the power supply device will not further negotiate the charging parameters with the device to receive power, at least not sending the charging parameters determined according to the target protocol to the device to receive power.

There are many communication methods between the power supply device and the target power receiving device, so there are many methods for the power supply device and the target power receiving device to negotiate the charging protocol, and several optional methods are provided below.

Step S121 may include the charging protocol is negotiated with the second coil for receiving the wireless charging signals of the device to receive power by utilizing the first coil or, the charging protocol is negotiated with the device to receive power based on a communication module different from the first coil.

In some examples, the power supply device may directly utilize the first coil to negotiate the charging parameters with the target power receiving device. At the moment, a communication data packet where the charging parameters are located will be modulated to be sent to the corresponding target power receiving device on a carrier of wireless charging, such that the first coil may negotiate the charging parameters with the target power receiving device under the condition of not adjusting the carrier frequency of the wireless charging signals. If the first coil and the second coil of the target power receiving device are the same in carrier frequency for wireless charging and wireless communication, when the first coil radiates a wireless signal carrying the communication data packet, the wireless signal serves as a communication signal of wireless communication and a charging signal of wireless charging at the same time, so that the electric energy conversion efficiency may be improved as much as possible.

Further, in order to ensure communication quality, when the power supply device and the target power receiving device communicate at the carrier of the first frequency, it may be default that the communication data packet is retransmitted for N times to ensure successful communication. N may be a positive integer greater than or equal to 1.

In another example, the first coil is also utilized to negotiate the charging parameters with the target power receiving device, but the carrier frequency used for the wireless charging signals is different from the carrier frequency used for communication such as charging parameter negotiation between the power supply device and the target power receiving device.

In the example of the disclosure, the carrier frequency for transmitting the wireless charging signals between the power supply device and the target power receiving device is a first frequency, while the carrier frequency for communication is a second frequency. The second frequency is different from the first frequency.

At the moment, the frequency of the working carrier may be switched between the first frequency or the second frequency through the capacitance value of the capacitor connected with the first coil and/or the resistance value of the resistor connected with the first coil. For example, the first coil periodically works at the first frequency and the second frequency in a switched mode to achieve communication and wireless charging. The duration of the first coil working at the first frequency is much less than that working at the second frequency. If the target power receiving device has a plurality of second coils, the plurality of second coils may be in an on state at the same time to communicate with the power supply device and perform wireless charging synchronously.

If the power supply device sends the wireless charging signals at the first frequency and communicates with the power supply device at the second frequency, the corresponding target power receiving device may be informed of a switching period of the working frequency of one first coil of the power supply device between the first frequency and the second frequency, such that the target power receiving device may adjust own working frequency according to the frequency to achieve successful communication and wireless charging with the power supply device. When the power supply device and the target power receiving device negotiate the charging parameters of wireless charging, the period may also serve as one of the charging parameters to be sent to the target power receiving device.

If the carrier frequency used for wireless communication between the power supply device and the target power receiving device is different from the carrier frequency for wireless charging, the communication success rate may be ensured during wireless communication.

In the example of the disclosure, a first resonance parameter and a second resonance parameter are collectively referred to as a resonance parameter. The resonance parameter includes, but is not limited to: a resonance frequency, and an LC parameter, where L is the inductance value, and C is the capacitance value.

In some examples, the power supply device may also negotiate the charging protocol with the device to receive power by adopting a communication module different from the first coil.

The communication module may be at least one of following: a Bluetooth communication module; a WiFi communication module; a near field communication (NFC) module; or an infrared communication module. If the communication module different from the first coil is utilized for communication, the interference on the first coil radiating the wireless charging signals may be lowered to the maximum extent.

If the power supply device uses the first coil to communicate with the target power receiving devices, in order to distinguish the different target power receiving devices, device identifications corresponding to the target power receiving devices will be carried when the power supply device and the target power receiving devices communicate. The device identifications may be physical identifications of the target power receiving devices, such as media access control (MAC) addresses or international mobile equipment identities (IMEI) of the target power receiving devices. Considering that the MAC addresses and the IMEIs are both long character strings and need to be carried by many bits, the power supply device may be used to allocate the device identifications to the target power receiving devices.

In some examples, the method further includes the device identifications are sent to the corresponding target power receiving devices. The device identifications are configured to distinguish the different target power receiving devices.

The device identifications are determined by the power supply device and sent to the target power receiving devices. As such, after the target power receiving devices receive the device identifications, if they need to communicate with the power supply device, the device identifications allocated by the power supply device to the target power receiving devices will be carried.

For example, after one device to receive power is determined as the target power receiving device, the target power receiving device is allocated with the device identification, and the allocated device identification and the charging parameters are sent to the target power receiving device together.

Since the first coil may wirelessly charge the plurality of target power receiving devices, the power supply device may know which target power receiving device the currently received communication data packet belongs to based on the device identifications, or, carry the device identifications needing to receive the communication data packet sent by the power supply device in the wireless signal, and the target power receiving device that receives the communication data packet needs to parse information of the communication data packet, while other target power receiving devices directly convert the received wireless signal into electric energy to charge batteries.

In one example, the method further includes azimuth information of the target power receiving devices relative to the power supply device is determined, and the device identifications are allocated to the target power receiving devices according to the azimuth information. The target power receiving devices in different directions of the power supply device are different in device identification.

For example, for the target power receiving devices located in different directions of the power supply device, the device identifications contain different direction codes. For the target power receiving devices located in the same direction, the device identifications contain different sequence numbers in the direction.

Assuming that the direction code in front of the power supply device is 0, a device 1 is the first target power receiving device in front, a device 2 is the second device in front, a sequence number of the device 1 may be 0 or 1, and a sequence number of the device 2 is the sequence number of the device 1 plus 1.

If the device identifications of the target power receiving devices are encoded according to the azimuth information, the target power receiving devices may know which direction they are currently located in the power supply device when receiving their own device identifications.

For example, different hall sensors are configured in different directions of the power supply device, and since the position of the hall sensor detecting the target power receiving device relative to the device center of the power supply device is relatively fixed, the power supply device may determine the azimuth information of the target power receiving device according to the position of an inductor such as the hall sensor detecting the corresponding target power receiving device.

In some examples, the method further includes the device identifications are allocated to the target power receiving devices according to a sensed order of the target power receiving devices.

The device identifications include sequence numbers and do not contain azimuth codes, and at the moment, when the power supply device allocates the device identifications to the target power receiving devices, the power supply device may determine the device identifications of remaining target power receiving devices according to the sequence numbers of the device identifications that have been allocated after the first coil starts to radiate the wireless charging signals at this time.

In a word, the power supply device has many methods to determine the device identifications, and the above two methods are simple instances.

In some examples, step S120 may include in response to the wireless charging signals being radiated from the first coil to at least one target power receiving device at the time the to-be-charged device to receive power is sensed, a charging protocol supported by the device to receive power is obtained, and in response to the charging protocol supported by the device to receive power containing a charging protocol adopted by the first coil for radiating the wireless charging signals, the charging protocol adopted by the first coil for radiating the wireless charging signals is used as the target protocol.

Since the power supply device uses one first coil to charge the plurality of target power receiving devices at the same time, at the moment, when the power supply device newly senses one device to receive power (referred to as the device to receive power), it is possible that the first coil has been in the working state and is wirelessly charging other target power receiving devices. If the first coil has been in the working state, the first coil has its working frequency currently.

If switching of working parameters of the first coil is to be reduced, it may be on the basis of whether the newly sensed device to receive power supports the charging protocol corresponding to the wireless signal currently radiated by the power supply device. The working parameters include, but are not limited to: one or more of the wireless charging technique, the carrier frequency of the wireless charging signals, charging power of the wireless charging signals and the like.

In the wireless charging negotiation process, the power supply device may instruct the device to receive power to send protocol information of the charging protocol supported by the target power receiving device to the power supply device, such that the power supply device can know which wireless charging protocols the target power receiving device supports. If the charging protocol supported by the newly sensed device to receive power contains the charging protocol used by the first coil for current wireless charging, the charging protocol used by the first coil for current work is determined as the target protocol, and the first coil may not switch the charging parameters and charging stop of the target power receiving device caused by switching of the charging parameters of the first coil will be avoided.

At the moment, in the negotiation process of the charging parameters, the newly sensed device to receive power may be informed of current charging parameters of the first coil, so that the target power receiving device can conveniently receive the wireless charging signals according to the received charging parameters so as to achieve wireless charging.

In some examples, step S120 may include in response to the charging protocol supported by the device to receive power not containing the charging protocol adopted by the first coil for radiating the wireless charging signals, whether a charging protocol supported by the device to receive power, the target power receiving devices and the power supply device exists is determined. In response to the charging protocol supported by the device to receive power, the target power receiving devices and the power supply device existing, the charging protocol supported by the device to receive power, the target power receiving devices and the power supply device is determined as the target protocol.

If the charging protocol supported by the newly sensed device to receive power does not contain the charging protocol which is currently used by the first coil, the target protocol will be determined again according to the charging protocol supported by the power supply device, the target power receiving devices and the device to receive power.

If there is a charging protocol which is jointly supported by the power supply device, at least one target power receiving device and the device to receive power, the jointly supported charging protocol is determined as the target protocol.

If the quantity of the charging protocol jointly supported by the power supply device, at least one target power receiving device and the device to receive power is one, the charging protocol is determined as the target protocol.

If there are a plurality of charging protocols which are jointly supported by the power supply device, at least one target power receiving device and the device to receive power, one charging protocol is selected from the plurality of charging protocols jointly supported by the power supply device, the at least one target power receiving device and the device to receive power as the target protocol according to a preset strategy.

For example, according to the preset strategy and in combination with the charging efficiency of all current target power receiving devices (since there is the protocol jointly supported by the device to receive power, the power supply device and the target power receiving devices, the device to receive power has been considered as the target power receiving device at the moment) in a current charging stage, the jointly supported charging protocol with the highest charging efficiency is selected as the target protocol.

For another example, according to the preset strategy and in combination with current electric quantities of all the current target power receiving devices, if the current electric quantity of one target power receiving device currently is lower than an electric quantity threshold value, a charging protocol supporting the highest charging power is selected as the target protocol.

The above is instances of selecting the target protocol from the plurality of charging protocols jointly supported by the power supply device, the target power receiving devices and the device to receive power according to the preset strategy, and specific implementations are not limited to this.

In some examples, after sensing the device to receive power, negotiating the charging protocol with the device to receive power, further includes in response to the charging protocol supported by the device to receive power, the target power receiving devices and the power supply device not existing, the target protocol is determined according to the preset strategy.

If the charging protocol supported by the power supply device, the at least one target power receiving device and the device to receive power does not exist, the target protocol is determined again according to the preset strategy.

Further, the target power receiving device will be determined again according to the target protocol. If the target power receiving device is determined again, the device identification of the target power receiving device may be allocated again, or the newly introduced target power receiving device is separately allocated with a device identification.

In one example, the determining the target protocol according to the preset strategy, includes at least one of selecting a charging protocol supported by most devices to receive power in charging protocols supported by the power supply device according to a strategy that the quantity of the target power receiving devices is the largest; selecting a charging protocol supported by both one or more devices to receive power with a minimum residual capacity and the power supply device as the target protocol according to a current electric quantity condition of the plurality of devices to receive power and an emergency charging strategy; and determining charging efficiencies in response to the power supply device adopting all alternative protocols to radiate the wireless charging signals according to a highest charging efficiency strategy, and determining an alternative protocol corresponding to a highest charging efficiency as the target protocol. The alternative protocol is any charging protocol supported by the power supply device.

For example, at the moment, the device to receive power includes: a target power receiving device that is being charged and a newly detected device to receive power.

Selecting the charging protocol supported by most devices to receive power in the charging protocols supported by the power supply device according to the strategy that the quantity of the target power receiving devices is the largest may achieve that one power supply device charges as many target power receiving devices as possible.

In some cases, if the power supply device detects the plurality of devices to receive power at the same time, based on this strategy, under the condition that there is no charging protocol that is supported by the power supply device, the target power receiving devices and the devices to receive power, most target power receiving devices are wirelessly charged through replacement of the target power receiving devices.

If a certain device to receive power is in urgent need of using electricity at present, for example, according to current electric quantity conditions, current remaining currents of at least one device to receive power are too low, for example, lower than 20% or 10% or 5%, if the currently valid preset strategy is the emergency charging strategy, a charging protocol both supported by the power supply device and the device to receive power which needs emergency charging will be alternatively adopted as the target protocol. If there are a plurality of charging protocols both supported by the device to receive power which needs emergency charging and the power supply device, the charging protocol with the highest charging power may be selected as the target protocol, so that the device needing emergency charging is emergently charged.

In other examples, different devices to receive power have different current residual capacities, and when the current residual capacity of the device to receive power is low, the device to receive power may be charged with large charging currents, so that the wireless charging signals radiated by the power supply device through one first coil can be utilized more efficiently.

In this case, the plurality of devices to receive power may be made to report own current residual capacities or currently supported largest charging currents during wireless charging with the target protocol, the charging efficiency during wireless charging with all the charging protocols is estimated, and the charging protocol with the highest charging efficiency is selected as the target protocol.

In one example, the method further includes in response to the device to receive power not supporting the target protocol, prompt information is sent to the device to receive power.

The prompt information may be output by the device to receive power. The prompt information may be a charging failure prompt. As such, after a user sees the charging failure prompt, a charging method corresponding to the device to receive power may be changed in time.

In some examples, the prompt information may further include: a charging failure reason. Outputting the charging failure reason may facilitate determining a reason for failure of wireless charging for the user. For example, in some cases, the power supply device is overloaded or the power supply device has charged devices, the device to receive power does not support the target protocol currently selected by the power supply device, and by outputting the failure reason, the user can conveniently determine whether the power supply device and the target power receiving devices have abnormalities. If the power supply device is overloaded or the device to receive power does not support the target protocol adopted by the power supply device, outputting the failure reason may tell the user that the power supply device and the target power receiving devices are normal. If the user wants to continue to use the power supply device to charge the device to receive power according to the failure reason, operations such as adjusting charging time, and taking out one or two target power receiving devices that are being charged.

Referring to FIG. 2A and FIG. 2B, a characteristic that a magnetic field of a columnar sending coil uniformly diverges to the surroundings is utilized, so that a function that one corresponding coil performs wireless charging on a plurality of coils is achieved.

For example, referring to FIG. 2B, a middle coil is a sending coil in a pad, the receiving end 1 is a handwriting pen coil, the receiving end 2 and the receiving end 3 are small planar coils of a watch/earphone, and the receiving end 4 is a resonant planar receiving coil of a leather sheath.

There may be two or more wireless charging solutions, that is, the wireless charging solutions may be Qi wireless charging of 78 to 205 KHz, or resonant wireless charging of MHz, or wireless charging of other frequencies (e.g., >205 KHz).

Corresponding switches K1/K2 are turned on according to which frequency band needs to be used. (Currents are sent from the resistor to the coil).

The form of changing capacitance or inductance may be adopted (not shown).

Different receiving ends may be recognized through hall devices to know which receiving end it is, so that a controller turns on corresponding switch MOS transistors. The receiving ends here are the aforementioned target power receiving devices.

A sending integrated circuit (IC) chip can work under one carrier frequency within one time, a plurality of receiving ends may be supported under one carrier frequency, but different receiving ends may be at different working frequencies.

If there are the plurality of receiving ends, a sending end works at an initially determined working frequency. A carrier wave is a carrier for transferring energy, a communication frequency is an information frequency to be transferred, and a communication packet transfers information based on the working frequency.

The sending end may perform communication and electric energy transmission with the different receiving ends according to the communication frequencies needed by the different receiving ends.

There are many methods of communication between the sending end and the receiving ends, specifically including at least one of following.

Method I: the receiving ends are consistent in communication frequency: 2 bits are selected from a communication protocol packet as marker bits, and are no longer used as standard data bits.

According to values of the marker bits, 00 indicates the receiving end 1, 01 indicates the receiving end 2, 10 indicates the receiving end 3, and 11 indicates the receiving end 4.

A certain communication protocol packet is sign byte (8 bits) data bits, 0x100 00001 indicates −1 for the receiving end 1, 0x110 00001 indicates −1 for the receiving end 3, 0x000 00001 indicates +1 for the receiving end 1, and 0x010 00001 indicates +1 for the receiving end 3, that is, the 7th bit is a sign bit, the 6th to the 5th bits are marker bits, and the 0th to the 4th bits are data bits. The sending end determines that the communication packet is a communication packet of the receiving end n according to the marker bits.

Method II: the receiving ends are different in communication frequency: the sending end may directly distinguish different receiving devices according to different frequencies.

Method III: communication may also be performed by means of other modules, such as a Bluetooth module or an NFC module.

In the technical solution provided by the examples of the disclosure, the power supply device can wirelessly charge the plurality of target power receiving devices at the same time by radiating the wireless charging signals to a plurality of directions, so that the charging efficiency can be improved.

Figure 6:
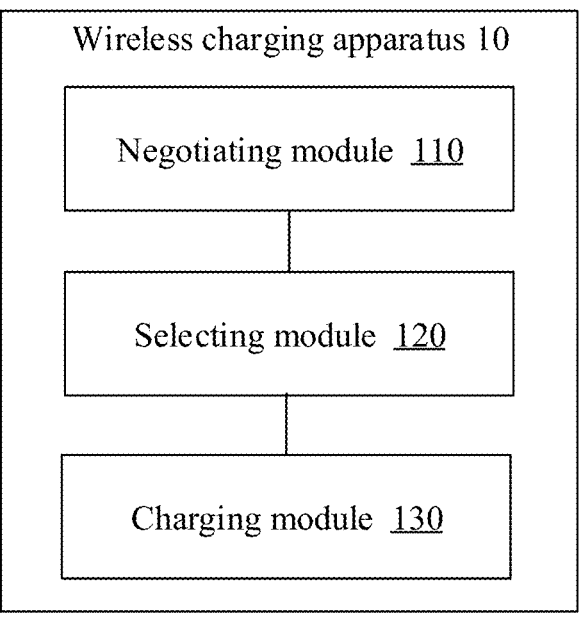
FIG. 6 is a schematic structural diagram of a wireless charging apparatus illustrated according to an example.

As shown in FIG. 6, an example of the disclosure provides a wireless charging apparatus 10, applied to a power supply device, the power supply device including: a first coil. The apparatus 10 includes a negotiating module 110, configured to negotiate charging parameters with a plurality of target power receiving devices, the target power receiving devices being: devices determined to receive wireless charging from the power supply device. The wireless charging apparatus further includes a selecting module 120, configured to select charging parameters supported by both the plurality of target power receiving devices and the power supply device as target parameters. And a charging module 130, configured to utilize the first coil to wirelessly charge the plurality of target power receiving devices according to the target parameters.

In some examples, the negotiating module 110, the selecting module 120 and the charging module 130 may be program modules. After being executed by a processor, the program modules can negotiate the charging parameters of wireless charging between the power supply device and the target power receiving devices and utilize one first coil of the power supply device to perform wireless charging with the target power receiving devices.

In some examples, the negotiating module 110, the selecting module 120 and the charging module 130 may be software-hardware combined modules which include, but are not limited to: various programmable arrays. The programmable arrays include, but are not limited to: field programmable arrays and/or complex programmable arrays.

In some other examples, the negotiating module 110, the selecting module 120 and the charging module 130 may be pure-hardware modules which include, but are not limited to: application-specific integrated circuits.

In some examples, the target parameters at least include: a carrier frequency of the first coil for transmitting the wireless charging signals.

In some examples, in response to the first coil being a columnar coil formed by winding a plurality of circles of wires, the columnar coil radiates the wireless charging signals to the plurality of directions at the same time.

In some examples, the negotiating module is configured to, after sensing any one device to receive power, negotiate a charging protocol with the device to receive power, the device to receive power being: a device preparing to receive wireless charging from the power supply device; in response to determining that the device to receive power supports a target protocol selected by the power supply device through negotiation, determine the device to receive power as the target power receiving device; and determine the target parameters according to the target protocol.

In some examples, the negotiating module is specifically configured to negotiate a charging protocol with a second coil for receiving the wireless charging signals of the device to receive power by utilizing the first coil; or, negotiate the charging protocol with the target power receiving devices based on a communication module different from the first coil.

In some examples, the carrier frequency of the wireless charging signals is a first frequency.

The negotiating module is specifically configured to negotiate the charging protocol through a first resonance parameter based on the first coil and through the first frequency based on the second coil; or, negotiate the charging protocol through a second resonance parameter based on the first coil and through a second frequency based on the second coil.

The second frequency is different from the first frequency, and the second resonance parameter is different from the first resonance parameter.

In one example, the apparatus further includes a first sending module, configured to send device identifications to the corresponding target power receiving devices. The device identifications are configured to distinguish the different target power receiving devices.

In one example, the apparatus further includes a second determining module, configured to determine azimuth information of the target power receiving devices relative to the power supply device, and a first allocating module, configured to allocate the device identifications to the target power receiving devices according to the azimuth information. The target power receiving devices in different directions of the power supply device are different in device identification.

In one example, the apparatus further includes a second allocating module, configured to allocate the device identifications to the target power receiving devices according to a sensed order of the target power receiving devices.

In some examples, the negotiating module is specifically configured to, in response to the wireless charging signals being radiated from the first coil to at least one target power receiving device at the time the device to receive power to be charged is sensed, obtain a charging protocol supported by the device to receive power; and in response to the charging protocol supported by the device to receive power containing a charging protocol adopted by the first coil for radiating the wireless charging signals, use the charging protocol adopted by the first coil for radiating the wireless charging signals as the target protocol.

In some examples, the negotiating module is further specifically configured to, in response to the charging protocol supported by the device to receive power not containing the charging protocol adopted by the first coil for radiating the wireless charging signals, determine whether a charging protocol supported by the device to receive power, the target power receiving devices and the power supply device exists; and in response to the charging protocol supported by the device to receive power, the target power receiving devices and the power supply device existing, determine the charging protocol supported by the device to receive power, the target power receiving devices and the power supply device as the target protocol.

In some examples, the second negotiating module is further specifically configured to, in response to the charging protocol supported by the device to receive power, the target power receiving devices and the power supply device not existing, determine the target protocol according to a preset strategy.

In some examples, the second negotiating module is specifically configured to execute at least one of selecting a charging protocol supported by most devices to receive power in charging protocols supported by the power supply device according to a strategy that the quantity of the target power receiving devices is the largest; selecting a charging protocol supported by both one or more devices to receive power with a minimum residual capacity and the power supply device as the target protocol according to a current electric quantity condition of the plurality of devices to receive power and an emergency charging strategy; or determining charging efficiencies in response to the power supply device adopting all alternative protocols to radiate the wireless charging signals according to a highest charging efficiency strategy, and determining an alternative protocol corresponding to a highest charging efficiency as the target protocol. The alternative protocol is any charging protocol supported by the power supply device.

In one example, the apparatus further includes a second sending module, configured to, in response to the device to receive power not supporting the target protocol, send prompt information to the device to receive power.

An example of the disclosure provides an electronic device, including a memory, configured to store processor-executable instructions and a processor, connected with the memory.

The processor is configured to execute the wireless charging method provided by any aforementioned technical solution.

The processor may include storage media of various types. The storage media are non-transitory computer storage media, and can continue to memorize information stored thereon after a communication device is powered down.

The processor may be connected with the memory via a bus and the like, and is configured to read executable programs stored on the memory, such as executing at least one of the wireless charging methods shown in any one of FIG. 1 and/or FIG. 5.

Figure 7:
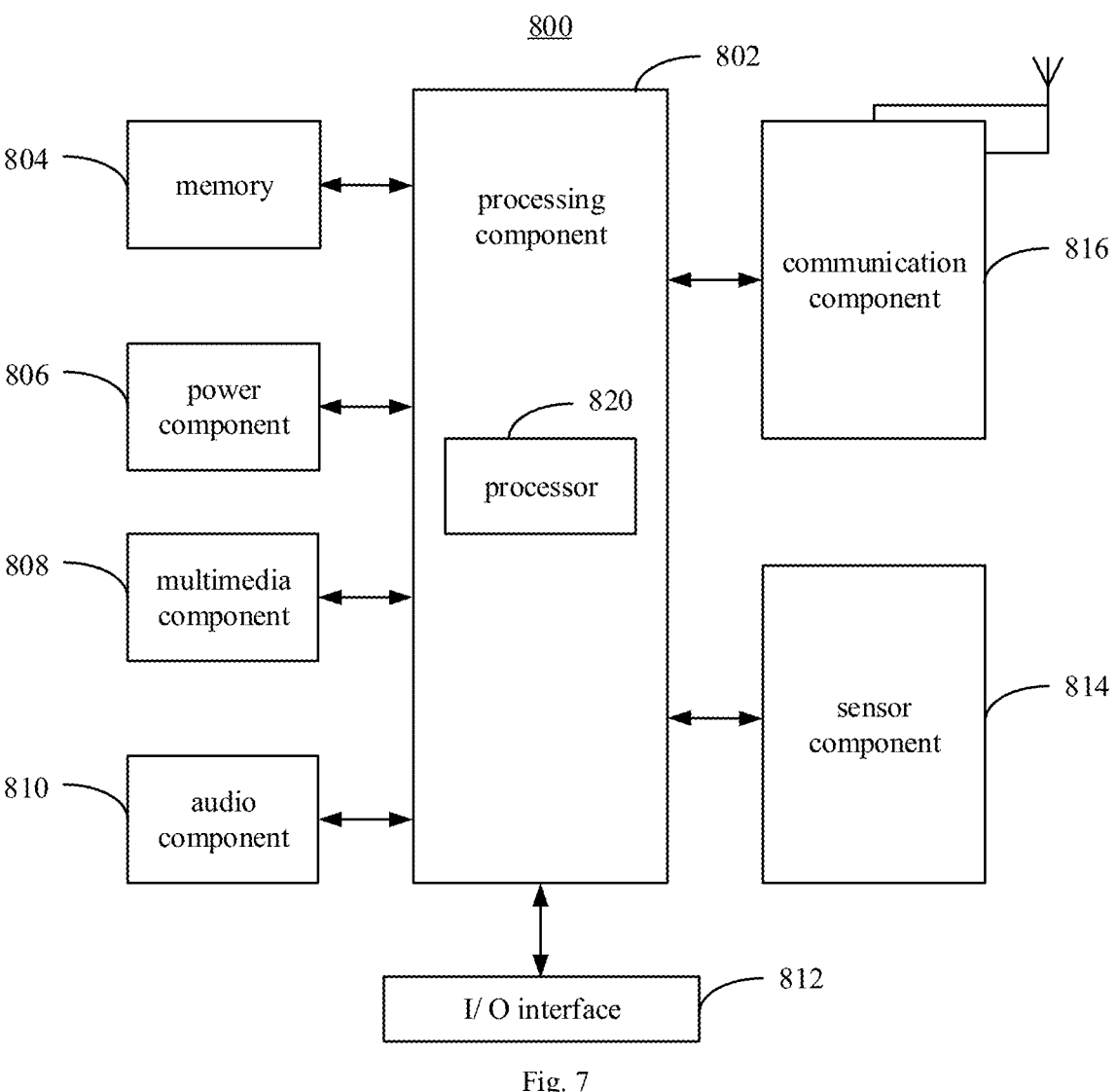
FIG. 7 is a schematic structural diagram of an electronic device illustrated according to an example.

The electronic device may contain the aforementioned power supply device. FIG. 7 is a block diagram of an electronic device 800 illustrated according to an example. For example, the electronic device 800 may be contained in terminal devices such as a mobile phone and a mobile computer, or servers or other devices.

Referring to FIG. 7, the electronic device 800 may include one or more of the following components: a processing component 802, a memory 804, a power component 806, a multimedia component 808, a multimedia data component 810, an input/output (I/O) interface 812, a sensor component 814, and a communication component 816.

The processing component 802 typically controls the overall operation of the electronic device 800, such as operations associated with display, telephone call, data communication, camera operations, and recording operations. The processing component 802 may include one or more processors 820 to execute instructions to complete all or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the device 800. Examples of these data include instructions for any application or method operating on the electronic device 800, contact data, phonebook data, messages, pictures, videos, etc. The memory 804 may be implemented by any type of volatile or nonvolatile storage device or a combination of them, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or optic disk.

The power component 806 provides power for various components of the electronic device 800. The power component 806 may include a power management system, one or more power sources and other components associated with generating, managing and distributing power for the electronic device 800.

The multimedia component 808 includes a screen providing an output interface between the electronic device 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor can not only sense the boundary of the touch or sliding operation, but also detect the duration and pressure related to the touch or sliding operation. In some examples, the multimedia component 808 includes a front camera and/or a rear camera. When the device 800 is in an operation state, such as a shooting state or a video state, the front camera and/or the rear camera can receive external multimedia data. Each front camera and rear camera can be a fixed optical lens system or have a focal length and optical zoom capability.

The multimedia data component 810 is configured to output and/or input multimedia data signals. For example, the multimedia data component 810 includes a microphone (MIC) configured to receive an external multimedia data signal when the electronic device 800 is in the operation state, such as a call state, a recording state, and a speech recognition state. The received multimedia data signal may be further stored in the memory 804 or sent via the communication component 816. In some examples, the multimedia data component 810 also includes a speaker for outputting the multimedia data signal.

The I/O interface 812 provides an interface between the processing component 802 and a peripheral interface module which can be a keyboard, a click wheel, a button, etc. These buttons may include but are not limited to: a home button, volume buttons, a start button and a lock button.

The sensor component 814 includes one or more sensors for providing state evaluation of various aspects of the electronic device 800. For example, the sensor component 814 can detect an on/off state of the electronic device 800 and the relative positioning of the components, for example, the component is a display and a keypad of the electronic device 800. The sensor component 814 can also detect the change of the position of the electronic device 800 or one component of the electronic device 800, the presence or absence of user contact with the electronic device 800, the azimuth or acceleration/deceleration of the electronic device 800, and temperature change of the electronic device 800. The sensor component 814 may include a proximity sensor configured to detect the presence of nearby objects without any physical contact. The sensor component 814 may further include an optical sensor, such as a CMOS or CCD image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the electronic device 800 and other devices. The electronic device 800 may access a wireless network based on a communication standard, such as Wi-Fi, 2G or 3G, or a combination of them. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology and other technologies.

In an example, the electronic device 800 may be implemented by one or more application-specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements for performing the above method.

In an example, a non-transitory computer-readable storage medium including instructions, such as the memory 804 including instructions, which can be executed by the processor 820 of the electronic device 800 to complete the above method, is also provided. For example, the non-transitory computer-readable storage medium may be a ROM, a random access memory (RAM), a CD-ROM, a magnetic tape, a floppy disk, an optical data storage device, etc.

An example of the disclosure provides a computer storage medium. The computer storage medium may be a non-transitory computer readable storage medium. When executed by a processor of a power supply device, instructions in the storage medium causes the power supply device to execute the wireless charging method applied to the power supply device provided by any aforementioned example, and at least one of the methods shown in any one of FIG. 1, FIG. 5 to FIG. 6 and FIG. 9 can be executed.

After the instructions stored in the computer storage medium are executed, the instructions are applied to the power supply device. The power supply device includes: negotiating charging parameters with a plurality of target power receiving devices, the target power receiving devices being: devices determined to receive wireless charging from the power supply device; selecting charging parameters supported by both the plurality of target power receiving devices and the power supply device as target parameters; and utilizing a first coil to wirelessly charge the plurality of target power receiving devices according to the target parameters.

It can be understood that the target parameters at least include: a carrier frequency of the first coil for transmitting the wireless charging signals. It can be understood that the first coil is a columnar coil formed by winding a plurality of circles of wires, and the columnar coil radiates the wireless charging signals to the plurality of directions at the same time.

It can be understood that the selecting the charging parameters both supported by the plurality of target power receiving devices and the power supply device as the target parameters, includes: after sensing any one device to receive power, a charging protocol is negotiated with the device to receive power, the device to receive power being: a device preparing to receive wireless charging from the power supply device; in response to determining that the device to receive power supports a target protocol selected by the power supply device through negotiation, the device to receive power is determined as the target power receiving device; and the target parameters are determined according to the target protocol.

It can be understood that after the device to receive power is sensed, the negotiating the charging protocol with the device to receive power includes: a charging protocol is negotiated with a second coil for receiving the wireless charging signals of the device to receive power by utilizing the first coil; or, the charging protocol is negotiated with the device to receive power based on a communication module different from the first coil.

It can be understood that the carrier frequency of the wireless charging signals is a first frequency.

The negotiating the charging protocol with the second coil for receiving the wireless charging signals of the device to receive power includes: the charging protocol is negotiated through a first resonance parameter based on the first coil and through the first frequency based on the second coil; or, the charging protocol is negotiated through a second resonance parameter based on the first coil and through a second frequency based on the second coil. The second frequency is different from the first frequency, and the second resonance parameter is different from the first resonance parameter.

It can be understood that the method further includes: device identifications are sent to the target power receiving devices. The device identifications are configured to distinguish the different target power receiving devices.

It can be understood that the method further includes: azimuth information of the target power receiving devices relative to the power supply device is determined; and the device identifications are allocated to the target power receiving devices according to the azimuth information. The target power receiving devices in different directions of the power supply device are different in device identification.

It can be understood that the method further includes: the device identifications are allocated to the target power receiving devices according to a sensed order of the target power receiving devices.

It can be understood that after the device to receive power is sensed, the negotiating the charging protocol with the device to receive power includes: in response to the wireless charging signals being radiated from the first coils to at least one target power receiving device at the time the device to receive power is sensed, a charging protocol supported by the device to receive power is obtained; and in response to the charging protocol supported by the device to receive power containing a charging protocol adopted by the first coils for radiating the wireless charging signals, the charging protocol adopted by the first coils for radiating the wireless charging signals is used as the target protocol.

It can be understood that, after sensing the device to receive power, the negotiating the charging protocol with the device to receive power, includes in response to the charging protocol supported by the device to receive power not containing the charging protocol adopted by the first coil for radiating the wireless charging signals.

Whether a charging protocol supported by the device to receive power, the target power receiving devices and the power supply device exists is determined and in response to the charging protocol supported by the device to receive power, the target power receiving devices and the power supply device existing, the charging protocol supported by the device to receive power, the target power receiving devices and the power supply device is determined as the target protocol.

It can be understood that, after the device to receive power is sensed, the negotiating the charging protocol with the device to receive power further includes: in response to the charging protocol supported by the device to receive power, the target power receiving devices and the power supply device not existing, the target protocol is determined according to the preset strategy.

It can be understood that, the determining the target protocol according to the preset strategy, includes at least one of selecting a charging protocol supported by most devices to receive power in charging protocols supported by the power supply device according to a strategy that the quantity of the target power receiving devices is the largest; selecting a charging protocol supported by both one or more devices to receive power with a minimum residual capacity and the power supply device as the target protocol according to a current electric quantity condition of the plurality of devices to receive power and an emergency charging strategy; and determining charging efficiencies in response to the power supply device adopting all alternative protocols to radiate the wireless charging signals according to a highest charging efficiency strategy, and determining an alternative protocol corresponding to a highest charging efficiency as the target protocol. The alternative protocol is any charging protocol supported by the power supply device.

It can be understood that the method further includes: in response to the device to receive power not supporting the target protocol, prompt information is sent to the device to receive power.

Other examples of the disclosure will be apparent to those skilled in the art from consideration of the specification and practice of the disclosure herein. The disclosure is intended to cover any variations, uses, or adaptations of the disclosure following the general principles of them and including such departures from the disclosure as come within known or customary practice in the art. It is intended that the specification and examples be considered as exemplary, with a true scope and spirit of the disclosure being indicated by the following claims.

It will be appreciated that the disclosure is not limited to the exact construction that has been described above and illustrated in the accompanying drawings, and that various modifications and changes may be made without departing from the scope of them. It is intended that the scope of the disclosure be limited by the appended claims.

What is claimed is:

1. A method for wireless charging performed by a power supply device, the method comprising:

negotiating charging parameters with a plurality of target power receiving devices, the target power receiving devices are determined to receive wireless charging from the power supply device;

selecting charging parameters supported by both the plurality of target power receiving devices and the power supply device as target parameters; and utilizing a first coil of the power supply device to wirelessly charge the plurality of target power receiving devices according to the target parameters, wherein the first coil radiates wireless charging signals to a plurality of directions at a same time, wherein selecting the charging parameters supported by both the plurality of target power receiving devices and the power supply device as the target parameters comprises:

after sensing any one device to receive power, negotiating a charging protocol with the any one device to receive power, the device to receive power being: a device preparing to receive wireless charging from the power supply device;

in response to determining that the device to receive power supports a target protocol selected by the power supply device through negotiation, determining the device to receive power as the target power receiving device; and determining the target parameters according to the target protocol;

wherein after sensing the any one device to receive power, the negotiating the charging protocol with the any one device to receive power comprises:

negotiating the charging protocol with a second coil for receiving the wireless charging signals of the any one device to receive power by utilizing the first coil.

2. The method according to claim 1, wherein the target parameters at least comprise: a carrier frequency of the first coil for transmitting the wireless charging signals.

3. The method according to claim 1, wherein the first coil is a columnar coil formed by winding a plurality of circles of wires, and the columnar coil radiates the wireless charging signals to the plurality of directions at the same time.

4. The method according to claim 1, wherein after sensing the any one device to receive power, the negotiating the charging protocol with the any one device to receive power further comprises:

negotiating the charging protocol with the any one device to receive power based on a communication module different from the first coil.

5. The method according to claim 4, wherein a carrier frequency of the wireless charging signals is a first frequency; and negotiating the charging protocol with the second coil for receiving the wireless charging signals of the any one device to receive power by utilizing the first coil comprises:

negotiating the charging protocol through a first resonance parameter based on the first coil and through the first frequency based on the second coil.

6. The method according to claim 4, wherein a carrier frequency of the wireless charging signals is a first frequency; and negotiating the charging protocol with the second coil for receiving the wireless charging signals of the any one device to receive power by utilizing the first coil comprises:

negotiating the charging protocol through a second resonance parameter based on the first coil and through a second frequency based on the second coil; wherein the second frequency is different from the first frequency, and the second resonance parameter is different from the first resonance parameter.

7. The method according to claim 1, wherein a carrier frequency of the wireless charging signals is a first frequency; and negotiating the charging protocol with the second coil for receiving the wireless charging signals of the any one device to receive power by utilizing the first coil comprises:

negotiating the charging protocol through a first resonance parameter based on the first coil and through the first frequency based on the second coil.

8. The method according to claim 1, wherein a carrier frequency of the wireless charging signals is a first frequency; and negotiating the charging protocol with the second coil for receiving the wireless charging signals of the any one device to receive power by utilizing the first coil comprises:

negotiating the charging protocol through a second resonance parameter based on the first coil and through a second frequency based on the second coil;

wherein the second frequency is different from the first frequency, and the second resonance parameter is different from the first resonance parameter.

9. The method according to claim 1, further comprising:

sending device identifications to the target power receiving devices, wherein the device identifications are configured to distinguish a different target power receiving devices among the plurality of target power receiving devices.

10. The method according to claim 9, further comprising:

determining azimuth information of the target power receiving devices relative to the power supply device; and allocating the device identifications to the target power receiving devices according to the azimuth information, wherein the target power receiving devices in different directions of the power supply device are different in device identification.

11. The method according to claim 9, further comprising: allocating the device identifications to the target power receiving devices according to a sensed order of the target power receiving devices.

12. The method according to claim 1, wherein after sensing the any one device to receive power, the negotiating the charging protocol with the any one device to receive power comprises:

in response to the wireless charging signals being radiated from the first coil to at least one target power receiving device at a time the device to receive power is sensed, obtaining a charging protocol supported by the device to receive power; and in response to the charging protocol supported by the device to receive power containing a charging protocol adopted by the first coil for radiating the wireless charging signals, using the charging protocol adopted by the first coil for radiating the wireless charging signals as the target protocol.

13. The method according to claim 12, wherein after sensing the any one device to receive power, the negotiating the charging protocol with the any one device to receive power comprises:

in response to the charging protocol supported by the device to receive power not containing the charging protocol adopted by the first coil for radiating the wireless charging signals, determining whether a charging protocol supported by the device to receive power, the target power receiving devices and the power supply device exists; and in response to the charging protocol supported by the device to receive power, the target power receiving devices and the power supply device existing, determining the charging protocol supported by the device to receive power, the target power receiving devices and the power supply device as the target protocol.

14. The method according to claim 13, wherein after sensing the any one device to receive power, the negotiating the charging protocol with the any one device to receive power further comprises:

in response to the charging protocol supported by the device to receive power, the target power receiving devices and the power supply device not existing, determining the target protocol according to a preset strategy.

15. The method according to claim 14, wherein determining the target protocol according to the preset strategy comprises at least one of:

selecting a charging protocol supported by most devices to receive power in charging protocols supported by the power supply device according to a strategy that a quantity of the target power receiving devices is the largest;

selecting a charging protocol supported by both one or more devices to receive power with a minimum residual capacity and the power supply device as the target protocol according to a current electric quantity condition of the plurality of devices to receive power and an emergency charging strategy; and determining charging efficiencies in response to the power supply device adopting all alternative protocols to radiate the wireless charging signals according to a highest charging efficiency strategy, and determining an alternative protocol corresponding to a highest charging efficiency as the target protocol, wherein the alternative protocol is any charging protocol supported by the power supply device.

16. The method according to claim 1, further comprising:
in response to the any one device to receive power not supporting the target protocol, sending prompt information to the any one device to receive power.

17. An electronic device, the electronic device comprising:

a first coil that radiates wireless charging signals to a plurality of directions at a same time;

a memory, configured to store processor-executable instructions; and a processor, connected with the memory;

wherein the processor is configured to:

negotiate charging parameters with a plurality of target power receiving devices, the target power receiving devices being: devices determined to receive wireless charging from the electronic device;

select charging parameters supported by both the plurality of target power receiving devices and the electronic device as target parameters; and utilize the first coil to wirelessly charge the plurality of target power receiving devices according to the target parameters;

wherein select the charging parameters supported by both the plurality of target power receiving devices and the electronic device as the target parameters comprises:

after sensing any one device to receive power, negotiating a charging protocol with the any one device to receive power, the device to receive power being: a device preparing to receive wireless charging from the electronic device;

in response to determining that the device to receive power supports a target protocol selected by the electronic device through negotiation, determining the device to receive power as the target power receiving device; and determining the target parameters according to the target protocol;

wherein after sensing the any one device to receive power, the negotiating the charging protocol with the any one device to receive power comprises:

negotiating the charging protocol with a second coil for receiving the wireless charging signals of the any one device to receive power by utilizing the first coil.

18. A non-transitory computer-readable storage medium storing instructions, the instructions, when executed by a processor of a computer cause the computer to perform a method comprising:

negotiating charging parameters with a plurality of target power receiving devices, the target power receiving devices being: devices determined to receive wireless charging from a power supply device, the power supply device comprising: a first coil radiating wireless charging signals to a plurality of directions at a same time;

selecting charging parameters supported by both the plurality of target power receiving devices and the power supply device as target parameters; and utilizing the first coil to wirelessly charge the plurality of target power receiving devices according to the target parameters;

wherein select the charging parameters supported by both the plurality of target power receiving devices and the power supply device as the target parameters comprises:

after sensing any one device to receive power, negotiating a charging protocol with the any one device to receive power, the device to receive power being a device preparing to receive wireless charging from the power supply device;

in response to determining that the device to receive power supports a target protocol selected by the power supply device through negotiation, determining the device to receive power as the target power receiving device; and determining the target parameters according to the target protocol;

wherein after sensing the any one device to receive power, the negotiating the charging protocol with the any one device to receive power comprises:

negotiating the charging protocol with a second coil for receiving the wireless charging signals of the any one device to receive power by utilizing the first coil.

\* \* \* \* \*